A. LEE.

Improvement in Operating Screw-Propellers.

No. 5,371.

Reissued April 22, 1873.

Witnesses.
H. K. Hand
Jill Albertin

Inventor.
Amos Lee

AM. PHOTO-LITHOGRAPHIC CO. N.Y. OSBORNE'S PROCESS.)

UNITED STATES PATENT OFFICE.

AMOS LEE, OF WHITE MARSH, PENNSYLVANIA.

IMPROVEMENT IN OPERATING SCREW-PROPELLERS.

Specification forming part of Letters Patent No. 132,588, dated October 29, 1872; reissue No. 5,371, dated April 22, 1873; application filed January 30, 1873.

*To all whom it may concern:*

Be it known that I, AMOS LEE, of White Marsh, county of Montgomery, State of Pennsylvania, have invented an Improvement in Operating Screw-Propellers, of which the following is a specification:

The object of my invention is to enable propellers, arranged in pairs at the stern of a canal-boat or other vessel, and operating when partially submerged in opposite directions, to be maintained at a certain determined depth in the water, whether the said vessel be light or loaded; and I accomplish this object by attaching the said propellers to a frame, so pivoted to the vessel as to be capable, with the propellers, of vertical adjustment thereon.

Figure 1:
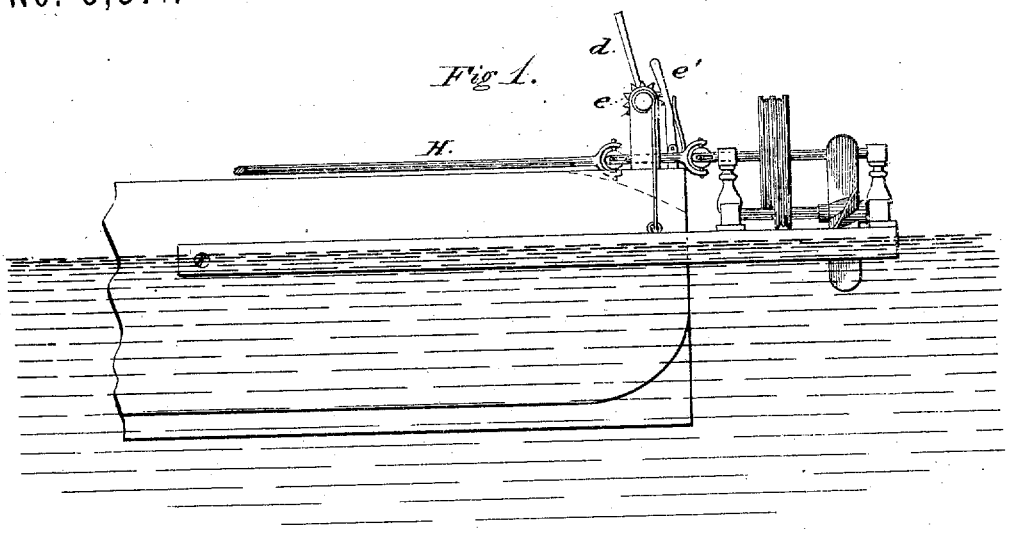
Figure 2:
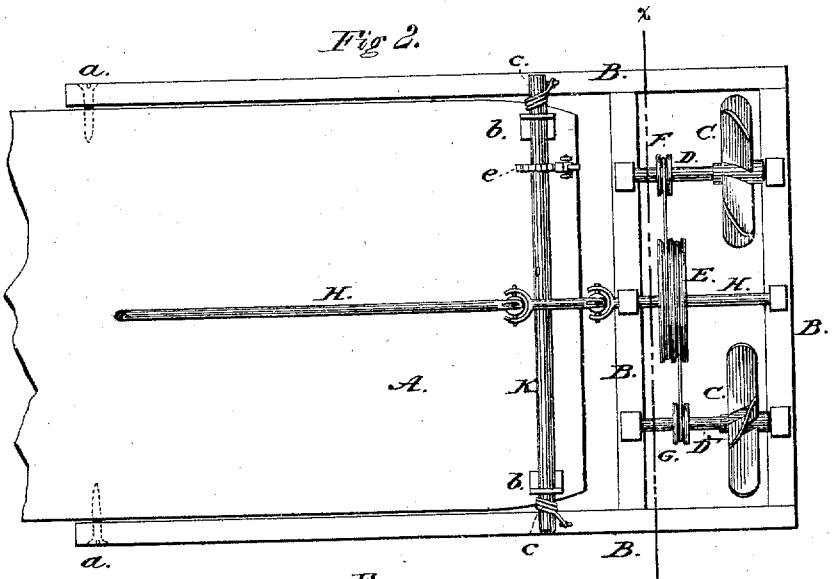
Figure 3:
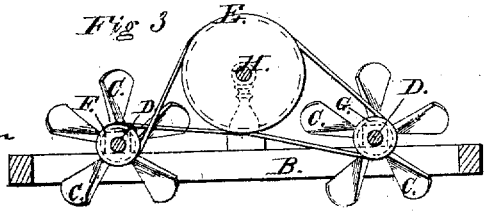

In the accompanying drawing, Figure 1 is a side elevation of a canal-boat, with the propellers attached in accordance with my invention; Fig. 2, a plan of the same; and Fig. 3, an end elevation.

A is the vessel, to which, at the points *a*, is pivoted a frame, B, which is allowed to move, when necessary, in a vertical plane, for the purpose of raising and lowering the propellers attached thereto. C C′ are propeller-wheels formed of a hub and blades shear-shaped in the usual manner to meet the water obliquely when partially submerged. These propellers are supported on shafts D D′, having suitable journal-bearings on the frame B, and move in a plane at right angles to their axes. The wheels turn from and toward each other, according as it is desired that the vessel shall move forward or backward, and, by means of a hoisting and lowering device, the said wheels may be maintained at a certain determined depth in the water, whether the stern of the vessel be depressed or elevated. On the main driving-shaft H is fixed a drum, E, which communicates motion, by means of chains or cords, to small pulleys F and G on the propeller-shafts, one of the said cords being crossed, in order that the propellers thus operated may be caused to revolve in opposite directions.

For convenience of illustration I give this particular sort of gearing, but any other suitable gearing may be employed.

Ordinary submerged propellers are unsuitable for canal-boats, as, owing to their nearness to the bottom, they are apt to underwash and break down the banks of the canal. Another objection to such propellers is that the water is driven to the right or left.

To overcome this first objection I allow my wheels to be only partially submerged; and the second objection I do away with by either throwing the water toward the middle of the boat, or by separating it to both sides at once, the result being that I can crowd the boat rapidly through the water without serious damage to the banks of the stream. It is essential, however, in using partially-submerged propellers, that they shall be maintained in a certain determined position in respect to the water-line, or that their blades shall be submerged to a certain determined depth, in order to operate most effectually; hence my invention, which enables the propellers to be adjusted vertically, and submerged to and maintained at the required depth, whether the boat be light or loaded.

In Figs. 1 and 2 I have shown a universal-joint coupling for the main shaft H, which allows an independent relative movement to the boat and pivoted frame, to which the propellers are fixed. Standards *b b* fixed to the deck of the vessel support a shaft, K, which serves as a windlass to raise or lower the propeller-frame, so as to keep the paddles of the wheels at a proper distance under the water. Ropes or chains *c c′* connect the boat with the propeller-frame. A lever, *d*, is used to revolve the shaft, while the ratchet-wheel *e*, controlled by the pawl *e′*, prevents a sudden downward movement of the propeller structure when the lever is released.

I claim as my invention—

A frame carrying two propellers and mechanism for driving them in opposite directions, adapted to be connected with and to be adjusted vertically on a canal-boat or other vessel, substantially as described.

In testimony whereof I have signed my name to this specification in the presence of two subscribing witnesses.

AMOS LEE.

Witnesses:

H. K. WEAND,

J. M. ALBERTSON.